United States Patent
Tsirkin et al.

(10) Patent No.: US 9,894,342 B2
(45) Date of Patent: Feb. 13, 2018

(54) FLICKER-FREE REMOTING SUPPORT FOR SERVER-RENDERED STEREOSCOPIC IMAGING

(71) Applicant: Red Hat Israel, Ltd., Ra'anana (IL)

(72) Inventors: Michael Tsirkin, Yokneam Illit (IL); Uri Lublin, Ra'anana (IL)

(73) Assignee: Red Hat Israel, Ltd., Ra'anana (IL)

(*) Notice: Subject to any disclaimer, the term of this patent is extended or adjusted under 35 U.S.C. 154(b) by 254 days.

(21) Appl. No.: 14/952,121

(22) Filed: Nov. 25, 2015

(65) Prior Publication Data

US 2017/0150117 A1    May 25, 2017

(51) Int. Cl.
*G06F 15/16* (2006.01)
*H04N 13/00* (2006.01)
*G06F 9/455* (2006.01)
*H04N 13/04* (2006.01)

(52) U.S. Cl.
CPC ..... *H04N 13/0059* (2013.01); *G06F 9/45558* (2013.01); *H04N 13/0033* (2013.01); *H04N 13/0497* (2013.01); *G06F 2009/45595* (2013.01)

(58) Field of Classification Search
CPC .................................................. H04N 13/0059
USPC ........................................................ 709/203
See application file for complete search history.

(56) References Cited

U.S. PATENT DOCUMENTS

| | | | |
|---|---|---|---|
| 4,631,580 A * | 12/1986 | Taube | H04N 13/0436 348/335 |
| 7,319,720 B2 | 1/2008 | Abrams, Jr. | |
| 7,563,228 B2 | 7/2009 | Ma et al. | |
| 8,290,824 B1 * | 10/2012 | Mesaros | G06Q 30/0207 705/14.23 |
| 8,341,624 B1 | 12/2012 | Hobbs | |
| 8,351,758 B2 | 1/2013 | Yamaji et al. | |
| 8,503,869 B2 | 8/2013 | Nakamura et al. | |
| 8,892,883 B2 | 11/2014 | Yerli | |
| 9,374,552 B2 * | 6/2016 | Taraki | H04N 5/76 |
| 2003/0212570 A1 * | 11/2003 | Chu | G06Q 10/087 705/28 |
| 2003/0227392 A1 * | 12/2003 | Ebert | G06K 17/00 340/8.1 |

(Continued)

OTHER PUBLICATIONS

Pajak et al., "Scalable Remote Rendering with Depth and Motion-flow Augmented Streaming", Apr. 28, 2011, excerpt from http://onlinelibrary.wiley.com/doi/10.1111/j.1467-8659.2011.01871.x/abstract.

(Continued)

*Primary Examiner* — Hamza Algibhah
(74) *Attorney, Agent, or Firm* — K&L Gates LLP

(57) ABSTRACT

A system includes a memory, one or more processors, a guest virtual machine, a hypervisor, and a client. The hypervisor receives, from the client, a first notification of stereoscopic capability. The hypervisor sends, to the guest virtual machine, a second notification of stereoscopic capability. The hypervisor receives, from the guest virtual machine, a plurality of frames included in a single composite frame. The hypervisor sends the plurality of frames to the client. The client receives the plurality of frames and identifies each one of the plurality of frames as a part of the single composite frame. The client stores the plurality of frames until each one of the frames included in the single composite frame have been received and identified. The client synchronizes with a display device to present the single composite frame.

20 Claims, 5 Drawing Sheets

(56) References Cited

U.S. PATENT DOCUMENTS

| | | | |
|---|---|---|---|
| 2005/0038758 A1* | 2/2005 | Hilbush | G06Q 10/06311 705/402 |
| 2006/0229895 A1* | 10/2006 | Kodger, Jr. | G06Q 10/025 705/333 |
| 2006/0253581 A1* | 11/2006 | Dixon | G06F 17/30861 709/225 |
| 2007/0147827 A1 | 6/2007 | Sheynman et al. | |
| 2008/0270209 A1* | 10/2008 | Mauseth | G06Q 10/10 705/7.29 |
| 2010/0063898 A1* | 3/2010 | Obrecht | G06Q 30/02 705/26.1 |
| 2010/0194857 A1 | 8/2010 | Mentz et al. | |
| 2011/0050423 A1* | 3/2011 | Cova | G06Q 10/08 340/572.1 |
| 2011/0082771 A1* | 4/2011 | Pritikin | G06Q 30/0603 705/27.1 |
| 2011/0137808 A1* | 6/2011 | Meyer | G06Q 10/00 705/304 |
| 2013/0019024 A1 | 1/2013 | Sheth et al. | |
| 2013/0310159 A1* | 11/2013 | Froy | G07F 17/3218 463/25 |
| 2014/0071236 A1* | 3/2014 | Tsukagoshi | H04N 13/0059 348/43 |
| 2014/0118489 A1* | 5/2014 | Suresh | H04N 19/597 348/43 |
| 2014/0278847 A1 | 9/2014 | Gallo | |
| 2014/0376644 A1* | 12/2014 | D'Amato Damato | H04N 13/0029 375/240.26 |
| 2015/0130897 A1* | 5/2015 | D'Amato Damato | H04N 13/0029 348/43 |
| 2015/0131969 A1* | 5/2015 | Taraki | H04N 5/76 386/248 |
| 2015/0213576 A1* | 7/2015 | Meuninck | H04N 13/0282 345/672 |
| 2016/0180514 A1* | 6/2016 | Cheng | G06T 11/60 382/173 |
| 2016/0191892 A1* | 6/2016 | Sobolev | H04N 13/0059 348/43 |
| 2017/0243323 A1* | 8/2017 | Croxford | G06T 1/60 |

OTHER PUBLICATIONS

Santhanam et al., "A Client-Server Framework for 3D Remote Visualization of Radiotherapy Treatment Space", Feb. 22, 2013, excerpt from http://www.ncbi.nlm.nih.gov/pmc/articles/PMC3579192/.

* cited by examiner

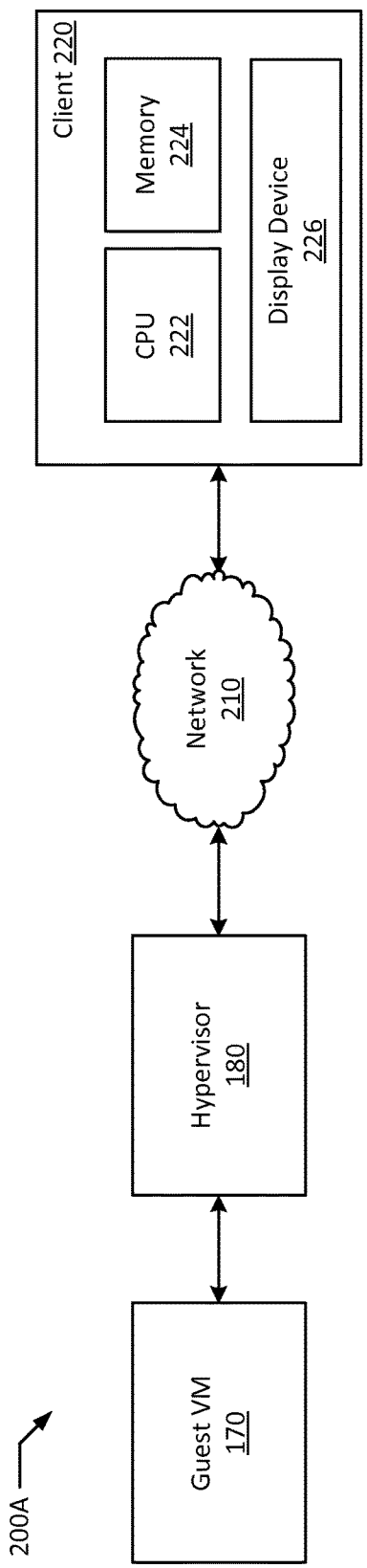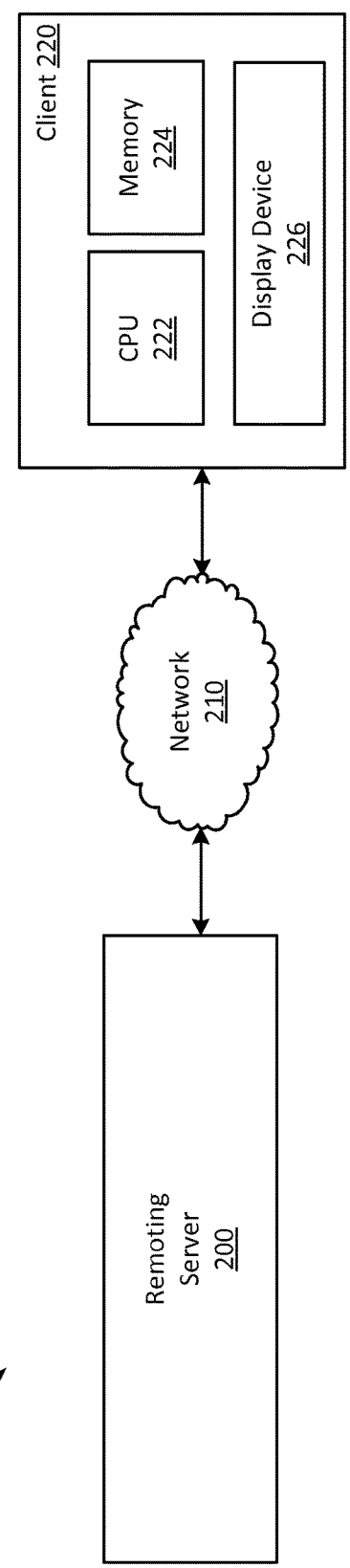
FIG. 2A
FIG. 2B

FLICKER-FREE REMOTING SUPPORT FOR SERVER-RENDERED STEREOSCOPIC IMAGING

BACKGROUND

The present disclosure relates generally to memory management of virtual machines and, more particularly, to flicker-free remoting support for server-rendered stereoscopic imaging. Stereoscopic imaging has grown popular for applications related to design, medical imaging, gaming, etc. as a way to present three-dimensional (3-D) information to users. Fundamentally, presentation of 3-D information relies on presenting multiple different images, or multiple different image streams (e.g., video streams), to users. For example, each eye might be shown a different image simultaneously. Displaying images in this way creates an illusion of image-depth, for users, otherwise known as stereoscopic effect.

When displaying multiple images or multiple image streams, to users, ideally the images or image streams are presented to users in a synchronized fashion. Failure to synchronize the multiple images, as users perceive the multiple images, may result in reduced stereoscopic effect. Moreover, users may perceive undesirable stereoscopic imaging defects, such as image flickering.

SUMMARY

The present disclosure provides new and innovative systems and methods for flicker-free remoting support for server-rendered stereoscopic imaging. For example, the system includes a memory, one or more processors, in communication with the memory, a guest virtual machine, configured to execute on the one or more processors, a hypervisor, configured to execute on the one or more processors, and a client, in communication with the hypervisor. The hypervisor receives, from the client, a first notification of stereoscopic capability. The hypervisor sends, to the guest virtual machine, a second notification of stereoscopic capability. The hypervisor receives, from the guest virtual machine, a plurality of frames included in a single composite frame. The hypervisor sends the plurality of frames to the client. The client receives the plurality of frames. The client identifies each one of the plurality of frames as a part of the single composite frame. The client stores the plurality of frames until each one of the frames included in the single composite frame have been received and identified. The client synchronizes with a display device to present the single composite frame.

Additional features and advantages of the disclosed methods and system are described in, and will be apparent from, the following Detailed Description and the Figures.

BRIEF DESCRIPTION OF THE FIGURES

FIGS. 2A-2B are block diagrams of example systems according to example embodiments of the present disclosure.

DETAILED DESCRIPTION OF EXAMPLE EMBODIMENTS

Figure 1:
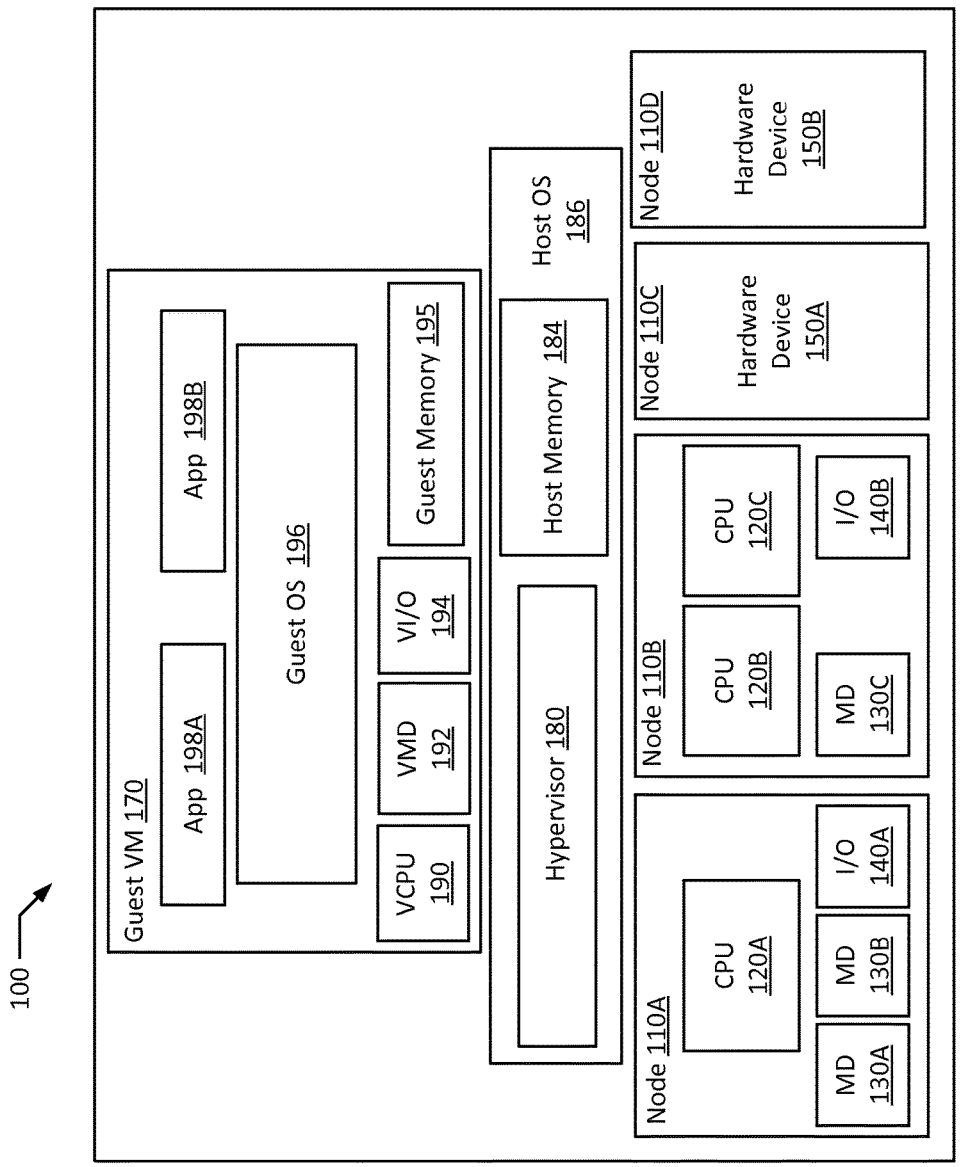
FIG. 1 is a block diagram of an example multi-processor computer system according to an example embodiment of the present disclosure.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processors 120A-C refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example embodiment, a processor may be a single core processor which is typically capable of executing one instruction at a time (or process a single pipeline of instructions), or a multi-core processor which may simultaneously execute multiple instructions. In another example embodiment, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, input/output device 140A-B refers to a device capable of providing an interface between one or more processors and an external device. The external device's operation is based on the processor inputting and/or outputting data.

Processors 120A-C may be interconnected using a variety of techniques, such as a point-to-point processor interconnect. Local connections within each node 110A-D, including the connections between a processor 120A and a memory device 130A-B and between a processor 120A and an I/O device 140A, may be provided by one or more local buses of suitable architecture, for example, peripheral component interconnect (PCI). As used herein, a device of the host operating system (host OS) 186 (or host device) may refer to CPU 120A-C, MD 130A-C, I/O 140A-B, a software device, and/or hardware device 150A-B.

As noted above, computer system 100 may run a guest virtual machine (guest VM) 170, by executing a software layer (e.g., hypervisor 180) above the hardware and below the guest virtual machine 170, as schematically shown in FIG. 1. In an example embodiment, the computer system 100 may include additional guest virtual machines. In an example embodiment, the hypervisor 180 may be a component of the host operating system 186 executed by the computer system 100. In another example embodiment, the hypervisor 180 may be provided by an application running on the operating system 186, or may run directly on the computer system 100 without an operating system beneath it. The hypervisor 180 may virtualize the physical layer, including processors, memory, and I/O devices, and present this virtualization to guest virtual machine 170 as devices, including a virtual processor (e.g., VCPU 190), a virtual memory device (e.g., VMD 192), and/or a virtual I/O device (e.g., VI/O 194). In an example embodiment, the hypervisor 180 additionally utilizes a virtual graphics device.

In an example embodiment, a guest virtual machine 170 may execute a guest operating system (guest OS) 196 which may utilize the underlying VCPU 190, VMD 192, and VI/O device 194. One or more applications 198A-B may be running on the guest virtual machine 170 under the guest operating system 196. In an example embodiment, the guest virtual machine 170 may include a virtual processor 190. Processor virtualization may be implemented by the hypervisor 180 scheduling time slots on one or more physical processors 120A-C such that from the guest operating system's perspective those time slots are scheduled on the virtual processor 190.

The hypervisor 180 manages host memory 184 for the host operating system 186 as well as memory allocated to the guest virtual machine 170 and guest operating system 196, such as guest memory 195 provided to guest operating system 196. Host memory 184 and guest memory 195 may be divided into a plurality of memory pages that are managed by the hypervisor 180. Guest memory 195 allocated to the guest operating system 196 is mapped from host memory 184 such that when a guest application 198A-B uses or accesses a memory page of guest memory 195 it is actually using or accessing host memory 184.

FIGS. 2A-2B are block diagrams of example systems according to example embodiments of the present disclosure. In an example embodiment, as illustrated by FIG. 2A, system 200A includes the hypervisor 180. The hypervisor 180 is in communication with the guest virtual machine 170. Likewise, the hypervisor 180 is in communication with the client 220 via a network 210, such that stereoscopic transmissions (e.g., multiple different images, multiple different image streams, etc.) may be transferred from the hypervisor 180 to the client 220 via network 210. For example, the network 210 may be a public network (e.g., the Internet), a private network (e.g., a local area network LAN) or wide area network (WAN)), or a combination thereof. For example, a client (e.g., the client 220 and/or additional clients) may be a personal computing device, server, virtual machine, or application executing on a personal computing device, server, one or more physical processors, etc. In an example embodiment, a plurality of other clients similar to the client 220 are, likewise, in communication with the hypervisor 180 via the network 210. In an example embodiment, the client 220 may connect directly to the hypervisor 180, rather than the network 210 (e.g., client 220 integrated within the computer system 100).

Additionally, the client 220 includes a client processor (CPU) 222, a client memory 224 and a display device 226. The display device 226 may be any type of device capable of displaying stereoscopic transmissions (e.g., multiple different images, multiple different image streams, etc.) such as a television, monitor, laptop, tablet, phone, etc. In an example embodiment, the display device 226 is separate from the client 220. As described in greater detail below, and more specifically with reference to FIGS. 3-5, the guest virtual machine 170 interacts with the client 220 and the display device 226, through the hypervisor 180 and the network 210.

For example, the guest virtual machine 170 may transmit stereoscopic signals to the client 220, by utilizing the hypervisor 180 and the network 210. The client 220 may then display the stereoscopic signals via the display device 226. In a different example embodiment, as illustrated by FIG. 2B, system 200B includes a remoting server 200, which replaces the guest virtual machine 170 and the hypervisor 180. The remoting server 200 is in communication with the client 220 via the network 210. For example, the remoting server 200 may transmit stereoscopic signals to the client 220 via the network 210. The client 220 may then display the stereoscopic signals via the display device 226.

FIGS. 3A-3E are flow diagrams illustrating an example method of transmitting stereoscopic signals. Although the example method is described with reference to the flow diagrams illustrated in FIGS. 3A-E, it will be appreciated that many other methods of performing the acts associated with the method may be used. For example, the order of some of the blocks may be changed, certain blocks may be combined with other blocks, and some of the blocks described are optional. The method may be performed by processing logic that may comprise hardware (circuitry, dedicated logic, etc.), software, or a combination of both.

Figure 3A:
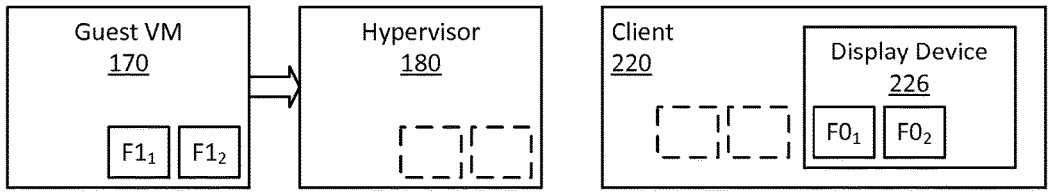
FIGS. 3A-3E are flow diagrams illustrating an example method of transmitting stereoscopic signals.

In an example embodiment, as illustrated by FIG. 3A, the client 220 initially displays, on display device 226, a previously rendered stereoscopic image including a single composite frame having two different image frames: a first image frame $F0_1$ and a second image frame $F0_2$. A stereoscopic image signal may include a sequence of single composite frames that are displayed sequentially to provide a stereoscopic video image. In different example embodiments, the previously rendered stereoscopic image may include more than two different image frames in a composite frame. A stereoscopic image signal may include two different image streams or more than two different image streams (e.g., virtual reality stereoscopic imaging). Each image stream of a stereoscopic image signal is a stream of data including image frames of a single perspective view. The guest virtual machine 170 has stored in memory (e.g., guest memory 195) a stereoscopic signal that has another composite frame that includes two different new image frames: a first new image frame $F1_1$ and a second new image frame $F1_2$. In different example embodiments, the stereoscopic signal may include more than two different image frames of a composite frame. The guest virtual machine 170 is in communication with the hypervisor 180. Likewise, the client 220 is in communication with the hypervisor 180 (e.g., via the network 210).

Figure 3B:
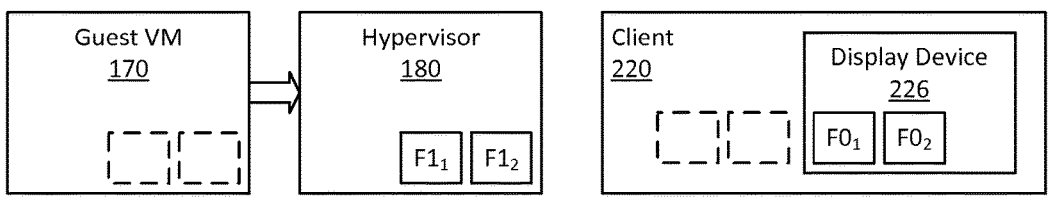

As illustrated in FIG. 3B, the hypervisor 180 receives, from the guest virtual machine 170, the two different new image frames $F1_1$ and $F1_2$ that make up the composite frame F1 in the stereoscopic signal. In this example embodiment, though the hypervisor 180 has received the two different new image frames $F1_1$ and $F1_2$, the client 220 has not yet received the entirety of both of the two different new image frames $F1_1$ and $F1_2$. For this reason, the client 220 still displays, on the display device 226, the previously rendered stereoscopic image including the two different image frames $F0_1$ and $F0_2$. In an example embodiment, upon receiving the two different new image frames $F1_1$ and $F1_2$ that make up the new stereoscopic image, the images are processed by the hypervisor 180. In an example embodiment, hypervisor 180 processing is executed through utilization of a virtual graphics device.

Figure 3C:
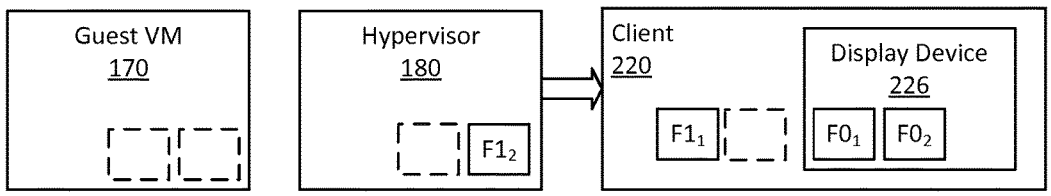

As illustrated in FIG. 3C, the hypervisor 180 begins sending the two different new image frames $F1_1$ and $F1_2$ that make up the new stereoscopic signal to the client 220. They hypervisor 180 sends the first new image frame $F1_1$ to the client 220. The client 220 receives the first new image frame $F1_1$, identifies the first new image frame $F1_1$ as a part of the composite frame F1 in the stereoscopic signal, and stores the first new image frame $F1_1$. In an example embodiment, the first new image frame $F1_1$ includes a frame identifier that the client 220 uses to identify the first new image frame $F1_1$ as a part of the composite frame F1 in the stereoscopic signal. Because the client 220 has not yet received and identified the second new image frame $F1_2$, the client 220 still displays, on the display device 226, the previously rendered stereoscopic image including the two different image frames $F0_1$ and $F0_2$. In a different example embodiment, the hypervisor 180 sends the second new image frame $F1_2$, before sending the first new image frame $F1_1$ and/or the client 220 receives the second new image frame $F1_2$, before receiving the first new image frame $F1_1$.

Figure 3D:
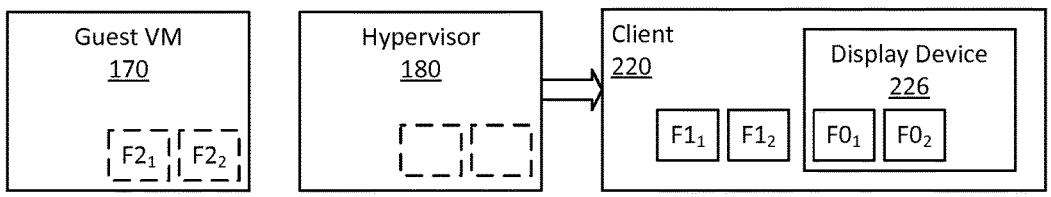

As illustrated in FIG. 3D, the hypervisor 180 completes sending the two different new image frames $F1_1$ and $F1_2$ that make up the new stereoscopic signal to the client 220, by sending the second new image frame $F1_2$ to the client 220. The client 220 receives the second new image frame $F1_2$, identifies the second new image frame $F1_2$ as a part of the composite frame F1 in the stereoscopic signal, and stores the second new image frame $F1_2$. In an example embodiment, the second new image frame $F1_2$ includes a frame identifier that the client 220 uses to identify the second new image frame $F1_2$ as a part of the composite frame F1. At this point, the client 220 has received, identified, and stored the entire composite frame F1. Likewise, as shown in FIG. 3D, the guest virtual machine 170 has stored in memory (e.g., guest memory 195) a stereoscopic signal that has a next composite frame that includes two different next image frames: a first next image frame $F2_1$ and a second next image frame $F2_2$.

Figure 3E:
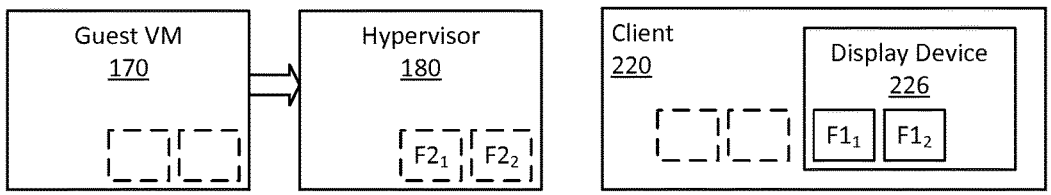

As illustrated in FIG. 3E, the client 220 synchronizes, with the display device 226, to display the new stereoscopic image including the composite frame F1, which includes both first new image frame $F1_1$ and second new image frame $F1_2$. In an example embodiment, synchronization by the client 220, with the display device 226, includes updating the single composite frame F1 at an active-glasses shutter close. In a different example embodiment, synchronization by the client 220, with the display device 226, includes updating the single composite frame F1 at a display refresh. Likewise, as shown in FIG. 3E, the hypervisor 180 receives, from the guest virtual machine 170, the two different next image frames $F2_1$ and $F2_2$ that make up the next composite frame F2 in the stereoscopic signal. In this example embodiment, though the hypervisor 180 has received the two different next image frames $F2_1$ and $F2_2$, the client 220 has not yet received the entirety of both of the two different next image frames $F2_1$ and $F2_2$. For this reason, the client 220 still displays, on the display device 226, the new stereoscopic image including the composite frame F1, which includes both first new image frame $F1_1$ and second new image frame $F1_2$.

Figure 4:
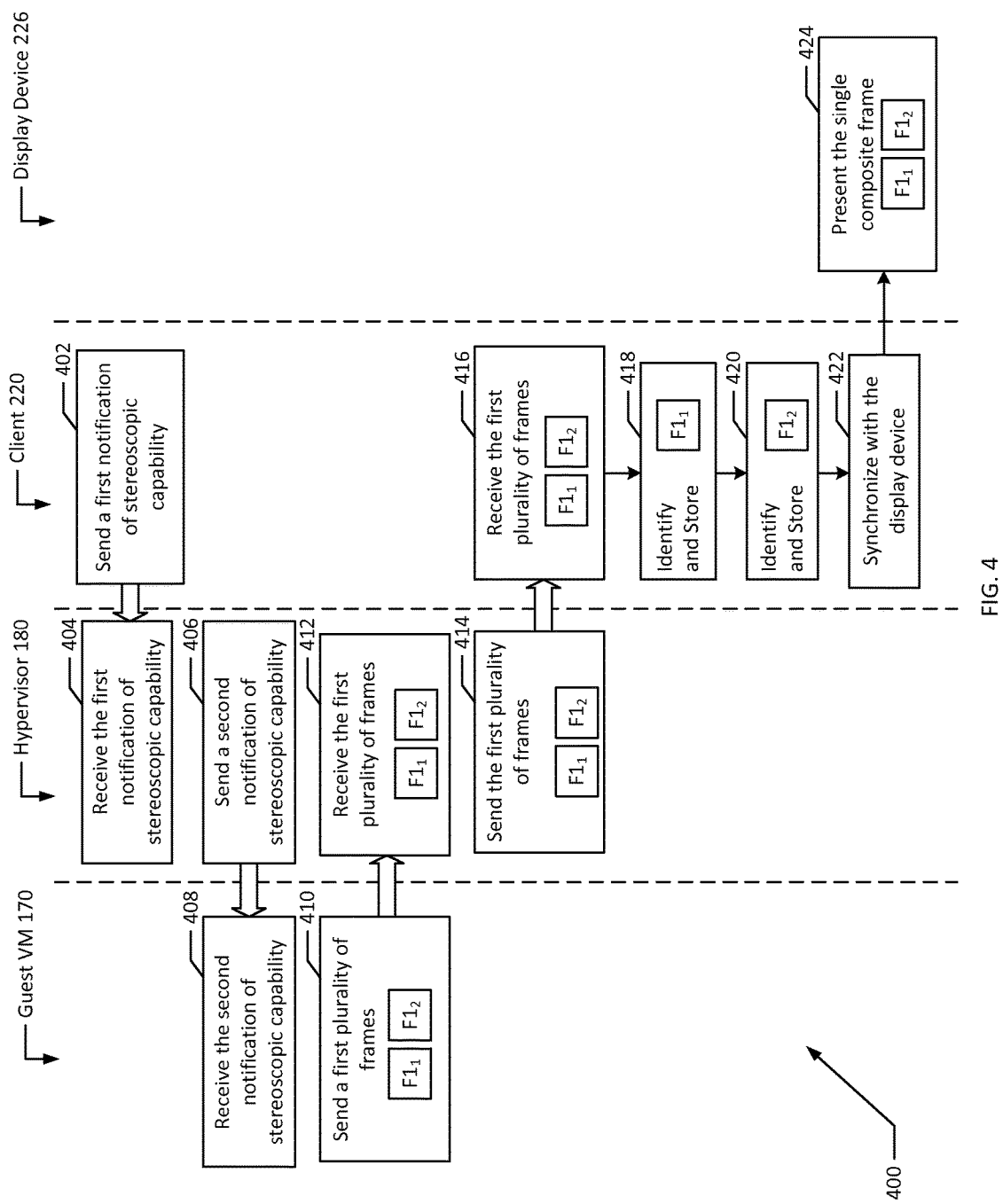
FIG. 4 is a flow diagram illustrating an example method of transmitting stereoscopic signals.

FIG. 4 is a flow diagram illustrating an example method 400 of transmitting stereoscopic signals. Although the example method 400 is described with reference to the flow diagram illustrated in FIG. 4, it will be appreciated that many other methods of performing the acts associated with the method may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

The example method 400 starts with a client 220, sending a first notification of stereoscopic capability to a hypervisor 180 (block 402). In example embodiments, the first notification may indicate whether or not the client 220 is capable of receiving and displaying stereoscopic transmissions. In a different example embodiment, the first notification of stereoscopic capability may additionally indicate a quantity of frames that the client 220 is configured to present in a single composite frame (e.g., the first notification may indicate that the client 220 can receive no more than three frames to present a single composite frame). In another different example embodiment, the user can select whether the client 220 has stereoscopic capability (e.g., stereoscopic capability can be toggled on and off). The hypervisor 180 receives the first notification of stereoscopic capability (block 404). The hypervisor 180 then sends a second notification of stereoscopic capability to the guest virtual machine 170 (block 406). In example embodiments, the second notification may indicate whether or not the guest virtual machine 170 is required to send stereoscopic transmissions to the hypervisor 180. In a different example embodiment, the second notification of stereoscopic capability may additionally indicate a quantity of frames that the client 220 is configured to present in the single composite frame. The guest virtual machine 170 receives the second notification of stereoscopic capability from the hypervisor 180 (block 408).

The guest virtual machine 170 then sends a first plurality of frames to the hypervisor 180 (block 410). In an example embodiment, the first plurality of frames (e.g., composite frame F1), includes a first new frame $F1_1$ and a second new frame $F1_2$. In a different example embodiment the first plurality of frames includes more than two frames. For example, a plurality of frames of a single composite frame F1 includes a first new frame $F1_1$, a second new frame $F1_2$, a third new frame $F1_3$, and a fourth new frame $F1_4$. In another different example embodiment, the first plurality of frames sent by the guest virtual machine 170 is dictated by the second notification. For example, if the second notification indicates that the client 220 is configured to present no more than three frames, the guest virtual machine 170 sends no more than three frames in a composite frame to the hypervisor 180. The hypervisor 180 receives, from the guest virtual machine 170, the first plurality of frames (block 412).

In an example embodiment, responsive to a third notification of stereoscopic capability indicating that a second client cannot process multiple signals, the hypervisor 180 may discard a first portion of the plurality of frames received from the guest virtual machine 170. The hypervisor 180 may likewise send a second portion of the plurality of frames received from the guest virtual machine 170 to the second client. For example, if a second client is unable to receive stereoscopic images, the second client will send the third notification to the hypervisor 180. Responsive to receiving the third notification, the hypervisor 180 will discard a first portion of the plurality of frames, while retaining the second portion of the plurality of frames (e.g., one frame). The hypervisor 180 will then only transmit the second portion of images to the second client. In this way, the hypervisor ensures that only images that can actually be processed, by the second client, are sent to the second client. In an example embodiment, the second client's inability to process multiple signals is a physical limitation of the second client (e.g., the second client does not have enough memory). In a different example embodiment, the second client's inability to process multiple signals is a selective limitation of the second client, for example, if the second client has the physical ability, but does not process multiple signals based on a user configuration or a display device 226 that is currently connected to the client 220. Selective limitations may be dictated by the second client, by the user, etc.

The hypervisor 180 then sends the first plurality of frames (e.g., composite frame F1) to the client 220 (block 414). In an example embodiment, the hypervisor 180 sends both frames, the first new frame $F1_1$ and a second new frame $F1_2$ at roughly the same time, such that both are received by the client 220 without delay. In an example embodiment, size limitations and data transfer rates dictate that the first new frame $F1_1$ and a second new frame $F1_2$ arrive at different times. In an example embodiment, the hypervisor 180 sends the first new frame $F1_1$ and a second new frame $F1_2$ at different times.

The first plurality of frames (e.g., composite frame F1) may be sent from the hypervisor 180 to the client 220 in a number of different ways. For example, in an example embodiment, each one of the frames included in the single composite frame (e.g., $F1_1$ and $F1_2$) have a common network path (e.g., a shared network path). In a different example embodiment, each one of the frames included in the single composite frame (e.g., $F1_1$ and $F1_2$) have parallel individual network paths. For example, frame $F1_1$ is sent along a first network path and frame $F1_2$ is send along a second network path. Optimization of network path usage, based on the frame size and the number of frames included in a single composite frame, may reduce latency of the computer system 100. For example, if a single composite frame includes four frames, all four frames could share the first network path, two frames could share the first network path and the other two frames could share the second network path, all four frames could have individual network paths, etc.

Likewise, the frames (e.g., $F1_1$ and $F1_2$) may include additional information beyond the stereoscopic image or image stream information. In an example embodiment, each one of the frames has a respective frame identifier. The client 220 may use the frame identifier to identify a frame (e.g., $F1_1$) as a part of a composite frame (e.g., F1) in the stereoscopic signal. Likewise, the client 220 may use the frame identifier to identify the individual frame and associate that frame with a specific portion of the display device 226 for proper stereoscopic display. In an example embodiment, the hypervisor 180 adds a respective frame identifier to each one of the frames, prior to sending the frames to the client 220.

The client 220 receives the first plurality of frames from the hypervisor 180 (block 416). Once the first plurality of frames has been received, the client 220 may identify and store each frame. Upon receipt of the first new frame $F1_1$, the client 220 identifies and stores the first new frame $F1_1$ (block 418). Likewise, upon receipt of the second new frame $F1_2$, the client 220 identifies and stores the second new frame $F1_2$ (block 420). Identification and storage may include reference to respective frame identifiers.

Once all the frames of a stereoscopic composite frame (e.g., frames $F1_1$ and $F1_2$) have been received, identified, and stored, the client 220 will synchronize with display device 226 (block 422). Through this synchronization, by the client 220, the display device 226 will present a stereoscopic composite frame as a stereoscopic image based on a single composite frame made up of frames $F1_1$ and $F1_2$ (block 424). In an example embodiment, synchronization by the client 220, with the display device 226, includes updating a previously rendered single composite frame with the newly received single composite frame including frames $F1_1$ and $F1_2$ at an active-glasses shutter close. In an example embodiment, synchronization by the client 220, with the display device 226, includes updating a previously rendered single composite frame with the newly received single composite frame including frames $F1_1$ and $F1_2$ at a display refresh. In an example embodiment, prior to synchronizing with the display device 226 to present the stereoscopic composite frame as a stereoscopic image (e.g., frames $F1_1$ and $F1_2$), the client 220, via display device 226, continues to present a previously rendered stereoscopic image (e.g., based on a previous single composite frame).

Figure 5:
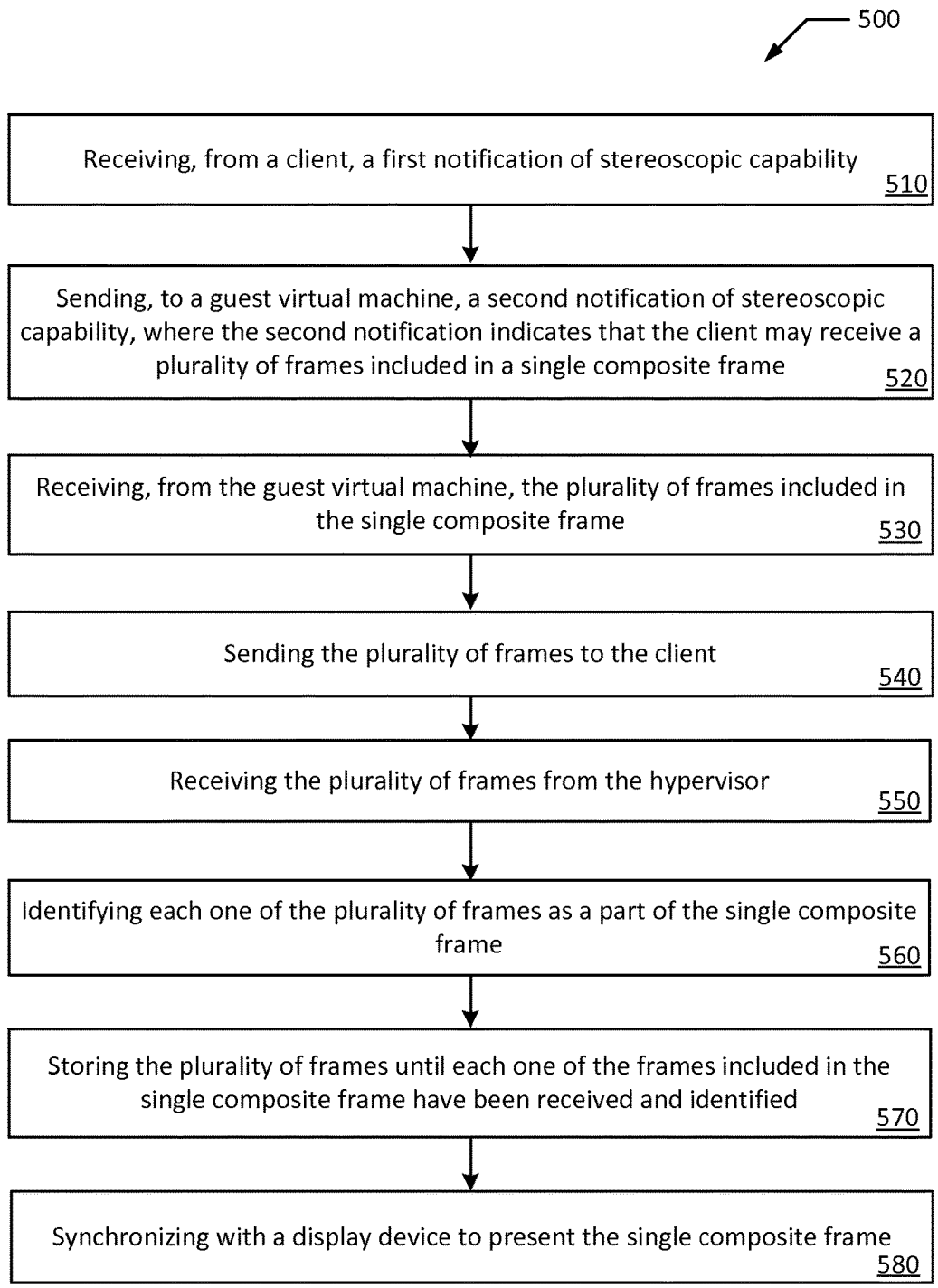
FIG. 5 is a flowchart illustrating an example method of transmitting stereoscopic signals.

FIG. 5 is a flowchart illustrating an example method 500 of transmitting stereoscopic signals. Although the example method 500 is described with reference to the flowchart illustrated in FIG. 5, it will be appreciated that many other methods of performing the acts associated with the method may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example embodiment, the example method 500 is performed by hypervisor 180.

The example method 500 starts with receiving, from a client 220, a first notification of stereoscopic capability (block 510). The example method 500 includes sending, to a guest virtual machine 170, a second notification of stereoscopic capability (block 520). The second notification of stereoscopic capability indicates that the client 220 may receive a plurality of frames included in a single composite frame. The example method 500 includes receiving, from the guest virtual machine 170, the plurality of frames included in the single composite frame (block 530). The example method 500 includes sending the plurality of frames to the client 220 (block 540).

The client 220 then receives the plurality of frames from the hypervisor 180 (block 550). The client 220 identifies each one of the plurality of frames as a part of the single composite frame (block 560). The client 220 stores the plurality of frames until each one of the frames included in the single composite frame have been received and identified (block 570). Finally, the client 220 synchronizes with a display device 226 to present the single composite frame (block 580).

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system of stereoscopic transmission, the system comprising:
a memory;
one or more processors, in communication with the memory;
a guest virtual machine, configured to execute on the one or more processors;
a hypervisor, configured to execute on the one or more processors;
a client, in communication with the hypervisor;
wherein the hypervisor is configured to:
receive, from the client, a first notification of stereoscopic capability,
send, to the guest virtual machine, a second notification of stereoscopic capability,
receive, from the guest virtual machine, a plurality of frames included in a single composite frame, and
send the plurality of frames to the client; and
wherein the client is configured to:
receive the plurality of frames,
identify each one of the plurality of frames as a part of the single composite frame,
store the plurality of frames until each one of the frames included in the single composite frame have been received and identified, and
synchronize with a display device to present the single composite frame.

2. The system of claim 1, wherein the first notification of stereoscopic capability and the second notification of stereoscopic capability indicate a quantity of frames that the client is configured to present in the single composite frame.

3. The system of claim 1, wherein a user can select whether the client has stereoscopic capability.

4. The system of claim 1, wherein each one of the plurality of frames included in the single composite frame have a common network path.

5. The system of claim 1, wherein each one of the plurality of frames included in the single composite frame have parallel individual network paths.

6. The system of claim 1, wherein each one of the plurality of frames have a respective frame identifier.

7. The system of claim 1, wherein synchronization with the display device includes updating the single composite frame at an active-glasses shutter close.

8. The system of claim 1, wherein synchronization with the display device includes updating the single composite frame at a display refresh.

9. The system of claim 1, wherein the hypervisor utilizes a virtual graphics device.

10. The system of claim 1, wherein the guest virtual machine and the hypervisor are provided in a remoting server.

11. The system of claim 1, wherein the client includes the display device.

12. A method of transmitting stereoscopic signals, the method comprising:
receiving, from a client, a first notification of stereoscopic capability;
sending, to a guest virtual machine, a second notification of stereoscopic capability, wherein the second notification indicates that the client may receive a plurality of frames included in a single composite frame;
receiving, from the guest virtual machine, the plurality of frames included in the single composite frame; and
sending the plurality of frames to the client,
wherein the client:
receives the plurality of frames,
identifies each one of the plurality of frames as a part of the single composite frame,
stores the plurality of frames until each one of the frames included in the single composite frame have been received and identified, and
synchronizes with a display device to present the single composite frame.

13. The method of claim 12, wherein the first notification of stereoscopic capability and the second notification of stereoscopic capability indicate a quantity of frames that the client is configured to present in the single composite frame.

14. The method of claim 12, further comprising, responsive to a third notification of stereoscopic capability indicating that a second client cannot process multiple signals, discarding a first portion of the plurality of frames received from the guest virtual machine and sending a second portion of the plurality of frames received from the guest virtual machine to the second client.

15. The method of claim 12, further comprising adding a respective frame identifier to each one of the plurality of frames prior to sending the plurality of frames to the client.

16. A method of processing stereoscopic transmissions, the method comprising:
sending, from a client to a hypervisor, a first notification of stereoscopic capability, wherein the hypervisor:
sends, to a guest virtual machine, a second notification of stereoscopic capability,
receives, from the guest virtual machine, a plurality of frames included in a single composite frame, and
sends the plurality of frames to the client;
receiving, at the client, the plurality of frames;
identifying each one of the plurality of frames as a part of the single composite frame;
storing the plurality of frames until each one of the frames included in the single composite frame have been received and identified; and
synchronizing with a display device to present the single composite frame.

17. The method of claim 16, wherein each one of the plurality of frames have a respective frame identifier.

18. The method of claim 16, further comprising, prior to synchronizing with the display device to present the single composite frame, presenting a previous single composite frame.

19. The method of claim 16, wherein synchronization with the display device includes updating the single composite frame at an active-glasses shutter close.

20. The method of claim 16, wherein synchronization with the display device includes updating the single composite frame at a display refresh.

* * * * *